(12) United States Patent
Osada et al.

(10) Patent No.: US 6,211,966 B1
(45) Date of Patent: Apr. 3, 2001

(54) PERIPHERAL DEVICE CONTROL SYSTEM

(75) Inventors: Mamoru Osada, Kawasaki; Takashi Inoue, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/164,274

(22) Filed: Oct. 1, 1998

(30) Foreign Application Priority Data

Oct. 3, 1997 (JP) .................................................. 9-286224
Dec. 26, 1997 (JP) .................................................. 9-358699

(51) Int. Cl.[7] .................................................. G06F 15/00
(52) U.S. Cl. .............................. 358/1.13; 345/2; 358/404
(58) Field of Search .................................... 358/404, 444, 358/1.14, 400, 505, 1.13; 345/2; 364/130; 710/15

(56) References Cited

U.S. PATENT DOCUMENTS 5,798,738 * 8/1998 Yamada ..................................... 345/2
5,923,439 * 7/1999 Tomida et al. ........................ 358/404

* cited by examiner

Primary Examiner—Jayprakash N. Gandhi
Assistant Examiner—Thanh Y. Tran
(74) Attorney, Agent, or Firm—Fitzpatrick, Cella, Harper & Scinto

(57) ABSTRACT

A client inquires service information or ability information which are peculiar to a plurality of or a single peripheral device, manages those information in a storage so that they can be updated, and requests a service to the peripheral device which can respond to a desired service request.

41 Claims, 12 Drawing Sheets

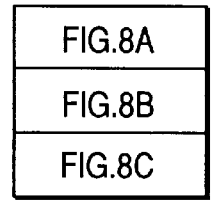
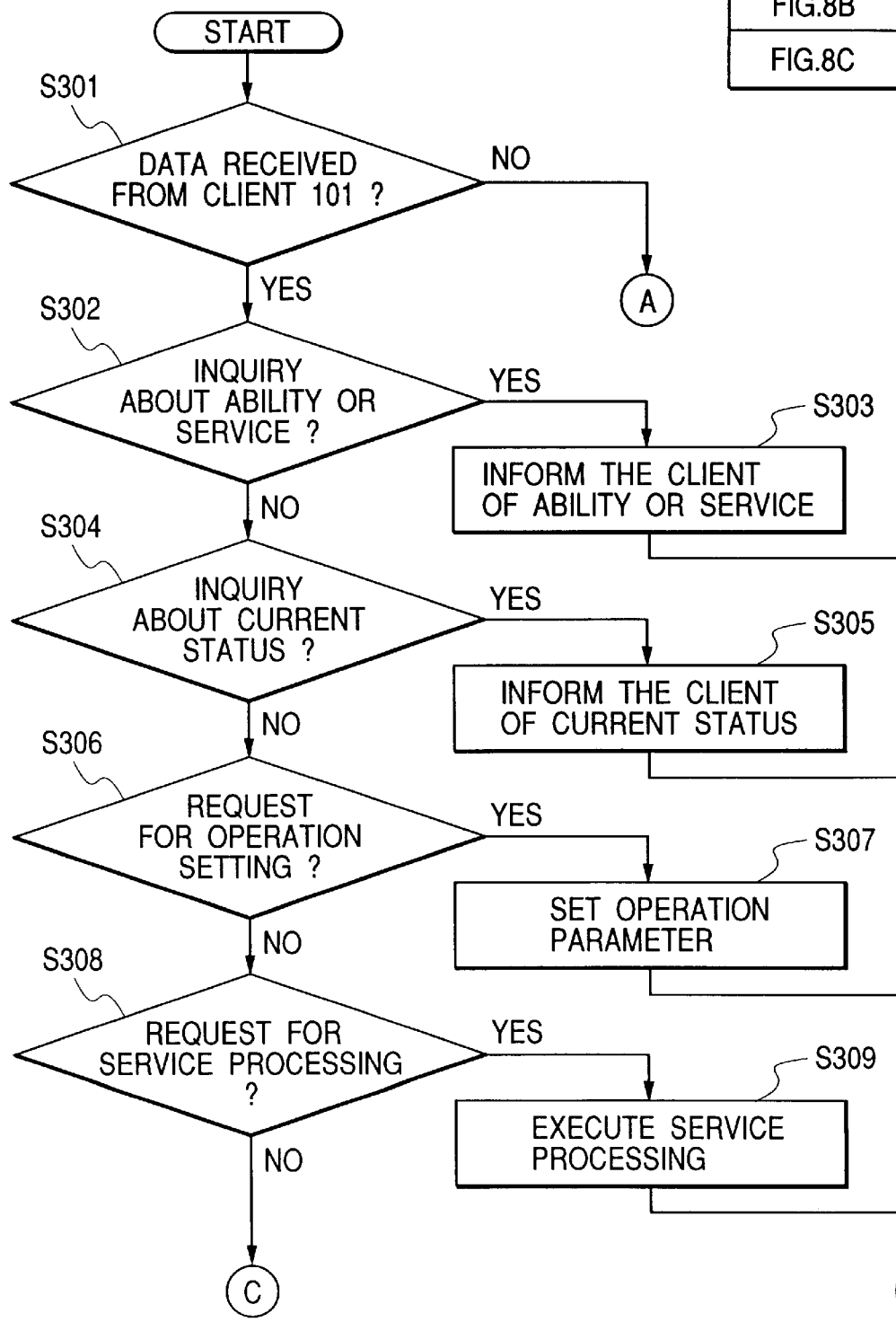
FIG. 8A

FIG. 9

MEM MEDIUM (FD/CD-ROM ETC,)

| DIRECTORY |
|---|
| PROGRAM CODES FOR THE STEPS OF FIG. 3 |
| PROGRAM CODES FOR THE STEPS OF FIG. 4 |
| PROGRAM CODES FOR THE STEPS OF FIG. 5 |
| PROGRAM CODES FOR THE STEPS OF FIG. 6 |
| PROGRAM CODES FOR THE STEPS OF FIG. 7 |
| ⋮ |

MEM MAP

PERIPHERAL DEVICE CONTROL SYSTEM

BACKGROUND OF THE INVENTION

1. Field of the Invention

The invention relates to an information processing apparatus which can communicate a plurality of or a single peripheral device capable of processing a service request based on a peculiar processing ability through a predetermined communication medium. The invention also relates to an information processing method of such an information processing apparatus and a storing medium in which a computer readable program has been stored.

2. Related Background Art

Hitherto, in an information processing system in which a computer (client) or the like and peripheral devices (a printer, a scanner, and the like) communicate through a predetermined communication medium, thereby performing a predetermined information process, according to a control method of the computer and the peripheral devices, the connection is performed mainly by a one-way communication from the client to the peripheral devices and a process is requested without knowing the current statuses, services, and abilities of the peripheral devices.

In the case where the computer (client) or the like and the peripheral devices are connected by a two-way communication, although the statuses, services, and abilities of the peripheral devices can be obtained, a change of the service or ability of the device cannot be detected. Consequently, all of the statuses, services, and abilities of the peripheral devices have to be examined each time a process is requested.

Since the conventional data processing system has been constructed as mentioned above, in the case where the computer and the peripheral devices are connected by the one-way communication, the current statuses, services, and abilities of the peripheral devices are unknown. Therefore, the control of the peripheral devices on the client side is performed by a method specialized every peripheral device, a method of requesting a process without knowing the status of the device, or the like, so that it is very inconvenient.

In this instance, it is also possible to provide a general peripheral device control method by previously preparing service information and ability information according to each peripheral device as information tables and by using these information tables. According to this method, however, each time a new peripheral device is connected, an information table according to the new peripheral device has to be prepared, so that it is troublesome.

Further, even if the service or ability changes by adding a new sub unit to the peripheral device or the like, it cannot be detected. Thus, the user himself must examine the service and ability of the device and set them or the like and it is inconvenient for the user.

Even if a multi-function peripheral device (MFP) is connected by the two-way communication, the status, all services, and all abilities of the multi-function peripheral device cannot be obtained.

In an office environment or the like, a system in which a plurality of peripheral devices are connected to each client so that a plurality of computers (clients) can be shared is constructed. In such a system, generally, each client and each peripheral device are connected by the one-way communication from the client to the peripheral device. Various information regarding the peripheral device such as a setting status (for example, a printer font and the like set in a printer) and the like of the connected peripheral device is held in each client. On the basis of the held information, the operation designation or the like of the peripheral device is performed. The held various information about the peripheral devices is information that is set on each client by the inputting operation of the user. When a change occurs in the information, the information is updated by the inputting operation of the user as necessary.

In the case where each client and each peripheral device are connected so that the two-way communication can be performed, information which is transmitted from the peripheral device to the client has been predetermined and the information which is sent to the client is only simple information such as a status or the like.

In the foregoing conventional system using the one-way communication, however, since various information about the peripheral devices is set on each client by the inputting operation of the user, for example, to know the information such as a printer font or the like which has been set at present in the printer, it is necessary to confirm the setting status of the printer by going to an installing location of the printer, to inquire to another user who knows the setting status, or the like. A use efficiency is low.

The various information regarding the peripheral devices held in the client is not always the latest information. In case of requesting a process to the corresponding peripheral device on the basis of the information held at present in the client, there is a case where the contents of the requested process cannot be obtained. In the case where the function has been improved by a version-up or the like of the peripheral device, there is a situation such that the function cannot be sufficiently utilized.

Further, in case of requesting a process to the corresponding peripheral device on the basis of the information held at present by the client, all of the information necessary to execute the process that is requested needs to be transferred to the peripheral device, resulting in an increase in transfer information amount when the process is requested.

In the foregoing conventional system using the two-way communication, since the information that is sent from the peripheral device to the client is only the predetermined information, the information designated on the client side cannot be obtained from the peripheral device. The peripheral device cannot be adequately managed on the client side and a use efficiency is low in a manner similar to the conventional system using the one-way communication.

It is an object of the invention to provide a peripheral device and a storing medium in which a use efficiency can be improved and a management to enable a function to be sufficiently utilized can be performed from the client side.

SUMMARY OF THE INVENTION

It is an object of the invention to provide an optimum use environment of a peripheral device having a plurality of kinds of services.

To accomplish the above object, according to the invention, there is provided an information processing apparatus for controlling a peripheral device having a plurality of kinds of services, comprising: obtaining means for obtaining all of service information showing the services of the peripheral device and ability information of the services shown by the service information from the peripheral device; and discriminating means for discriminating whether a job process can be requested to the peripheral device or not on the basis of the service information and the ability information obtained by the obtaining means.

To accomplish the above object, according to the invention, there is provided an information processing apparatus for controlling a peripheral device having a plurality of kinds of services, comprising: a controller for obtaining all of service information showing the services of the peripheral device and ability information of the services shown by the service information from the peripheral device and discriminating whether a job process can be requested to the peripheral device or not on the basis of the obtained service information and ability information.

To accomplish the above object, according to the invention, there is provided an information processing method of controlling a peripheral device having a plurality of kinds of services, comprising the steps of: obtaining all of service information showing the services of the peripheral device and ability information of the services shown by the service information from the peripheral device; and discriminating whether a job process can be requested to the peripheral device or not on the basis of the obtained service information and ability information.

To accomplish the above object, according to the invention, there is provided a storing medium to store a control program which can be executed by an information processing apparatus and is used to control a peripheral device having a plurality of kinds of services, wherein the program comprises the steps of: obtaining all of service information showing the services of the peripheral device and ability information of the services shown by the service information from the peripheral device; and discriminating whether a job process can be requested to the peripheral device or not on the basis of the obtained service information and ability information.

To accomplish the above object, according to the invention, there is provided an information processing system for controlling a peripheral device having a plurality of kinds of services, comprising: the peripheral device having the plurality of kinds of services; and an information processing apparatus for obtaining all of service information showing the services of the peripheral device and ability information of the services shown by the service information from the peripheral device and discriminating whether a job process can be requested to the peripheral device or not on the basis of the obtained service information and ability information.

To accomplish the above object, according to the invention, there is provided a peripheral device connected to an information processing apparatus, comprising: storing means for storing service information showing a plurality of kinds of services and ability information of services shown by the service information; and control means for, when there is a change of the service information or the ability information, notifying the information processing apparatus of such a change as a timing to obtain the changed information by the information processing apparatus.

To accomplish the above object, according to the invention, there is provided a peripheral device control method in a peripheral device connected to an information processing apparatus, comprising the steps of: detecting a change of service information showing a plurality of kinds of services and ability information of the services shown by the service information; and notifying the information processing apparatus of such a change as a timing to obtain the changed information by the information processing apparatus.

To accomplish the above object, according to the invention, there is provided a storing medium to store a control program which is executed by a peripheral device connected to an information processing apparatus, wherein the control program comprises the steps of: detecting a change of service information showing a plurality of kinds of services and ability information of the services shown by the service information; and notifying the information processing apparatus of such a change as a timing to obtain the changed information by the information processing apparatus.

To accomplish the above object, according to the invention, there is provided a peripheral device connected to an information processing apparatus, comprising: a controller for detecting a change of service information showing a plurality of kinds of services and ability information of the services shown by the service information and notifying the information processing apparatus of such a change as a timing to obtain the changed information by the information processing apparatus.

BRIEF DESCRIPTION OF THE DRAWINGS

FIG. 9 is a diagram for explaining a memory map of a storing medium to store various programs which can be read out by the information processing apparatus according to the invention.

DETAILED DESCRIPTION OF THE PREFERRED EMBODIMENTS

First Embodiment

Figure 1:
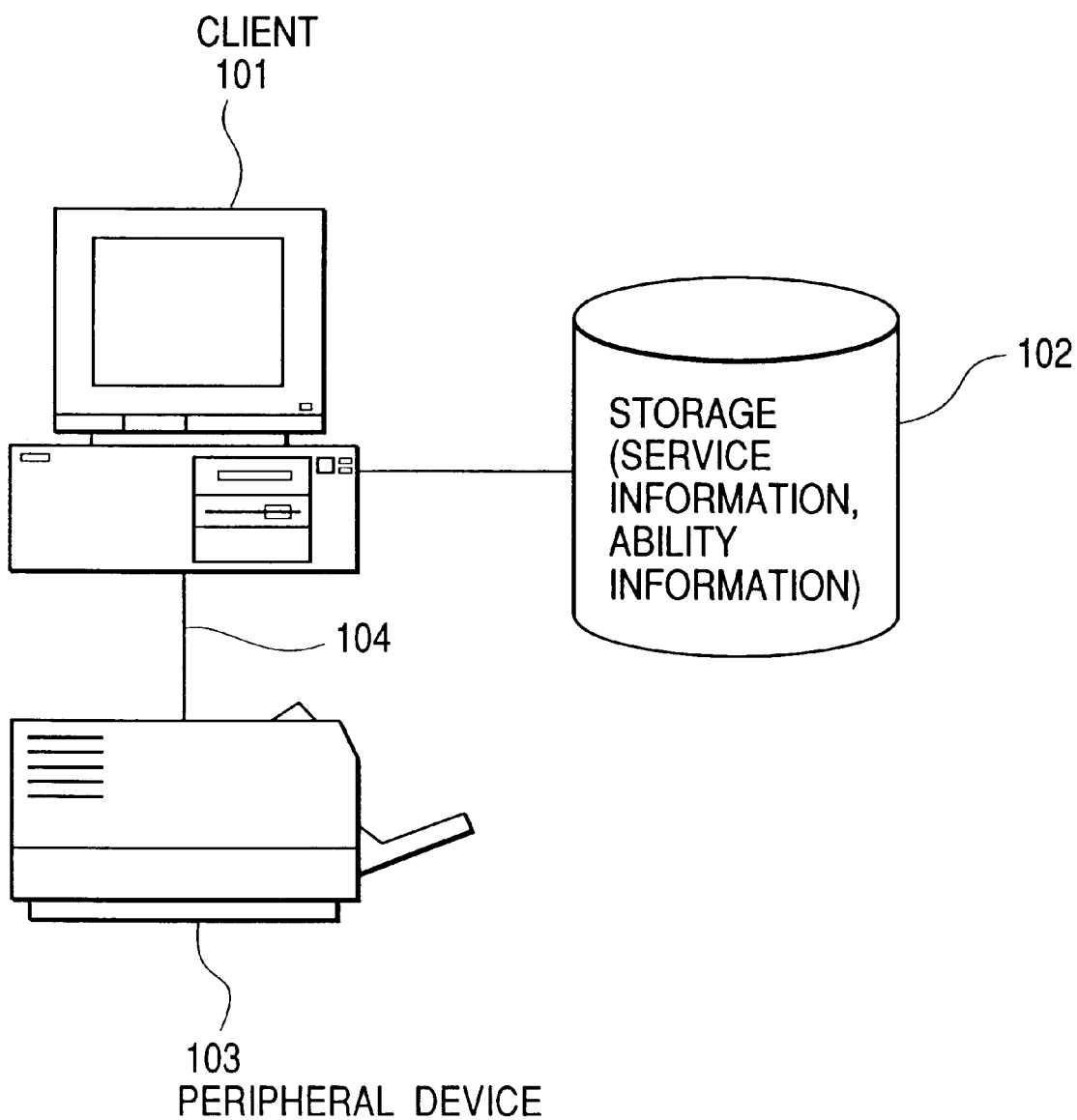
FIG. 1 is a diagram showing an example of a peripheral device control system to which an information processing apparatus according to the invention can be applied.

FIG. 1 is a diagram showing an example of a peripheral device control system to which an information processing apparatus according to the invention can be applied.

In the diagram, reference numeral 101 denotes a client who uses services of a peripheral device. The client is constructed by a computer device such as personal computer (PC), workstation, or the like for performing an information process by a predetermined OS. However, the peripheral device is not particularly limited to such a computer device but any other device can be used so long as it requests some service to a peripheral device (multi-function peripheral device having a printer engine and a scanner engine) through a communication medium.

Reference numeral 102 denotes a storage which functions as a storing area to store service information and ability information of a peripheral device 103 and is an RAM or a hard disk connected to the client 101. The service information and ability information of the peripheral device are stored as files or information tables into this area. A CPU of the client 101 can promptly write and read information into/from the storage 102.

The peripheral device 103 provides predetermined services to the client 101. As a peripheral device, a multi-function peripheral device for presenting a single service such as printer, scanner, or the like or a compound function peripheral device for presenting compound services such as facsimile, digital copying apparatus, or the like is considered. However, the invention is not particularly limited to those devices and any other peripheral device can be used so long as it presents some service to the client 101 through a communication medium 104.

Figure 2:
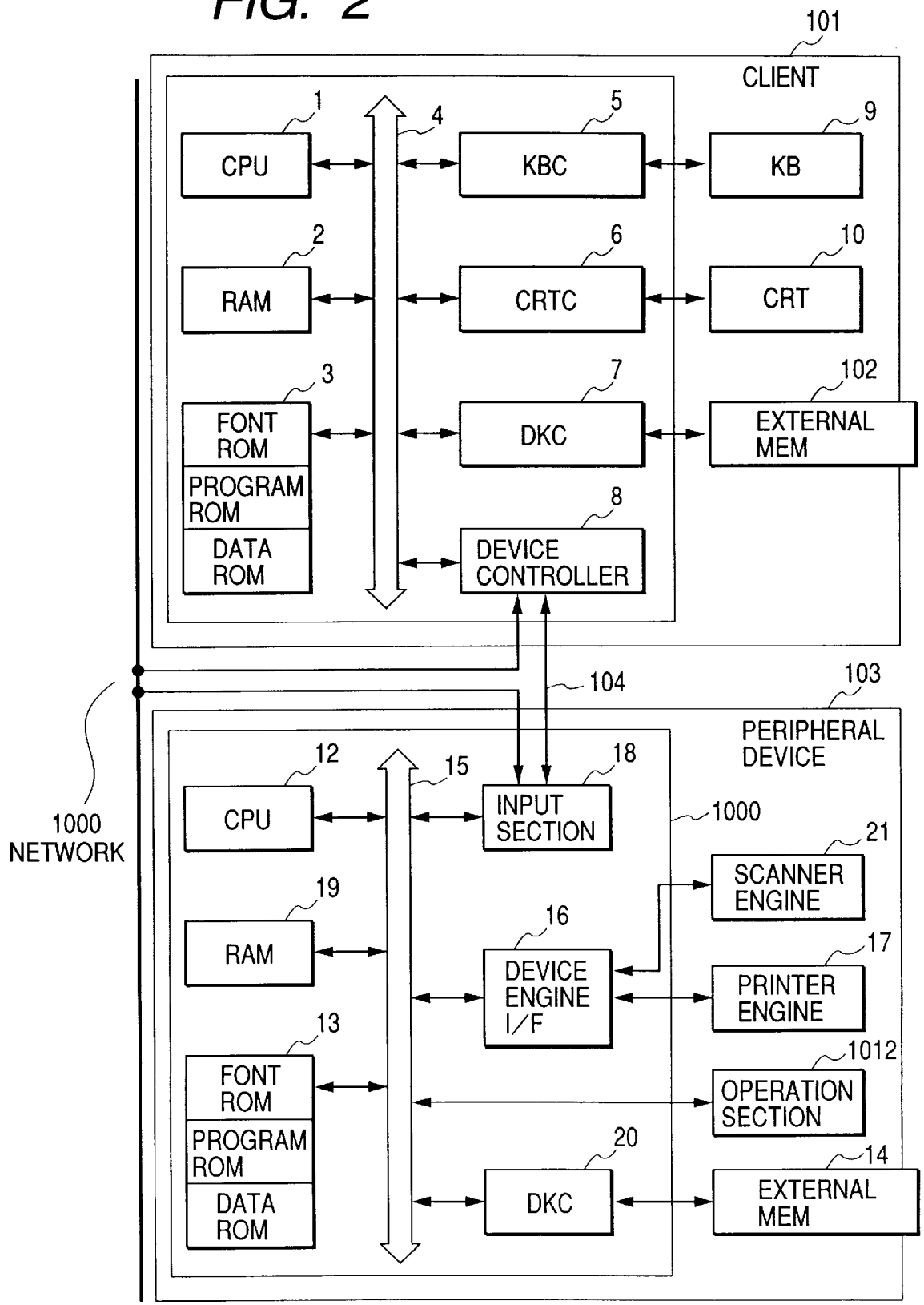
FIG. 2 is a block diagram for explaining a construction of a peripheral device control system showing the first embodiment of the invention.

The communication medium 104 connects the client 101 and peripheral device 103. A medium such as Centronics, RS-232C, SCSI, or the like for directly connecting the client and the peripheral device, a network 1000 such as LAN, WAN, or the like as shown in FIG. 2, or the like is considered as a communication medium 104. A plurality of peripheral devices can be also connected on the communication medium.

If the client 101 is regarded as an application such as an operation panel or the like and the peripheral device 103 is regarded as a hardware controller in the peripheral device and the communication medium 104 is regarded as a system bus, the invention can be also embodied as a control method that is installed in the peripheral device.

In the embodiment, "service" denotes a function which can be provided by the device. For example, the service corresponds to a "printing function (print job service)" of the printer, a "scanning function (scan job service)" of the scanner, a "transmitting function of FAX (fax send job service)" or a "receiving function of FAX (fax receive job service)" of the facsimile, or a "copying function (copy job service)" of the copying apparatus. Since there is also a compound machine having a plurality of those functions in one device, there is a case where the service is not limited to a single function. Even in a single printer, in case of constructing so as to have two printer engines, a case of presenting two services is also incorporated.

In the embodiment, "ability" corresponds to various set values and a setting range which can be set into the device when the service is used. For example, the set values and setting range are as follows: the number of print papers can be designated to 1 to 100; an enlargement or reduction magnification can be designated to a range from 50 to 200%; a standard/fine resolution can be designated in the FAX transmission; and sorter bins Nos. 1 to 10 can be used upon outputting.

Further, although various abilities are specified in accordance with the services, there is a case where the ability is shared by a plurality of services in dependence on the ability. For example, this is because the sorting ability is shared by each of the printing function and the copying function.

FIG. 2 is a block diagram for explaining a construction of a peripheral device control system to which the information processing apparatus showing the first embodiment of the invention can be applied. A peripheral device having a laser beam printer engine and a scanner engine (FIG. 1) will now be described as an example. It will be obviously understood that the invention can be applied to any one of a single device, a system comprising a plurality of devices, and a system in which a process is executed through the network 1000 such as an LAN or the like so long as the function of the invention is executed.

In the diagram, reference numeral 101 denotes the client having a CPU 1 for executing a document process in which a figure, an image, characters, a table (including a spreadsheet), and the like mixedly exist on the basis of a document processing program or the like stored in a program ROM in an ROM 3. The CPU 1 unitedly controls various devices connected to a system bus 4.

Control programs of the CPU 1 as shown in flowcharts of FIGS. 3 to 7 or the like are stored in the program ROM in the ROM 3. Font data which is used for the document process or the like is stored in a font ROM in the ROM 3. Various data (for example, programs of various kinds of page description languages, data for rasterization of the font, and the like) which is used when the document process or the like is executed is stored in a data ROM in the ROM 3. The control programs shown in the flowcharts of FIGS. 3 to 7 have been stored in the external memory 102 such as a hard disk or the like. The CPU 1 can also read out the control programs and load them into an RAM 2 and execute them.

Reference numeral 2 denotes the RAM which can be expanded by an option RAM or the like and functions as a main memory, a work area, or the like of the CPU 1. Reference numeral 5 denotes a keyboard controller (KBC) to control a key input from a keyboard 9 or a pointing device (not shown).

Reference numeral 6 denotes a CRT controller (CRTC) for controlling a display of a CRT display (CRT) 10. Reference numeral 7 denotes a disk controller (DKC) for controlling an access to the external memory 102 such as hard disk (HD), floppy disk (FD), or the like to store a boot program, various applications, font data, user file, edition file, or the like.

Reference numeral 8 denotes a device controller which is connected to the peripheral device 103 through the predetermined two-way interface (hereinafter, simply referred to as an interface) 104 or the network 1000 and executes a communication control process with the peripheral device 103. The CPU 1 executes, for example, a developing (rasterizing) process of an outline font into a display information RAM area set in the RAM 2, thereby enabling WYSIWYG on the CRT 10 to be executed.

The CPU 1 opens various registered windows on the basis of commands instructed by a mouse cursor or the like (not shown) on the CRT 10 and executes various data processes. The RAM 2, external memory 102, and the like function as a storage shown in FIG. 1 and store service information and ability information which are obtained from the peripheral device 103.

In the peripheral device 103, reference numeral 12 denotes a CPU for unitedly controlling accesses to various devices connected to a system bus 15 on the basis of control programs stored in a program ROM in an ROM 13 or the like, control programs stored in an external memory 14 (hard disk or the like), or the like. The CPU 12 outputs an image signal as output information to a printer engine 17 connected through a device engine interface 16 or inputs an image signal as input information from a scanner engine 21.

Figure 8B:
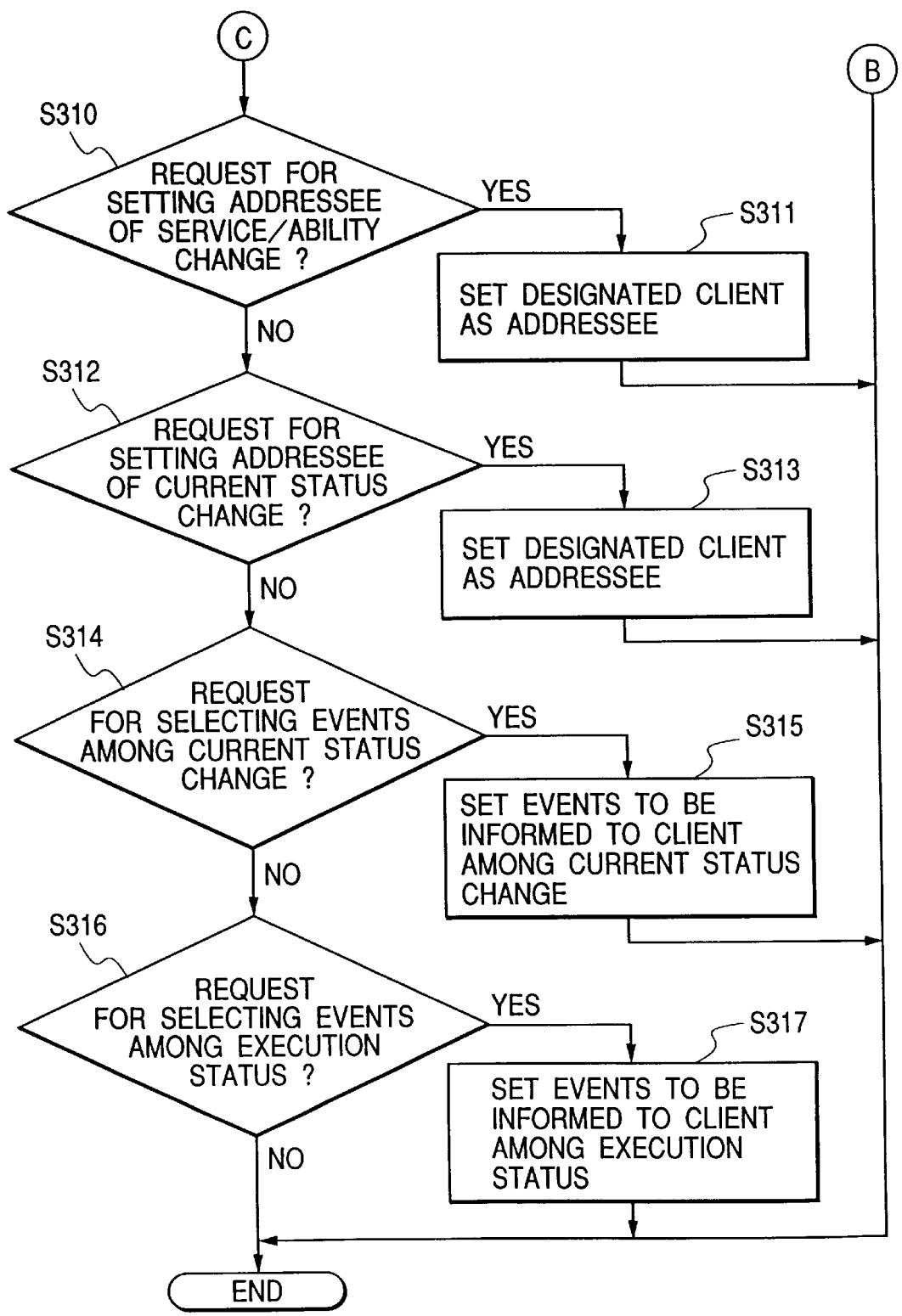
FIG. 8 consists of FIGS. 8A, 8B and 8C and is a flowchart showing an example of an information processing procedure in a peripheral device according to the invention.
Figure 8C:
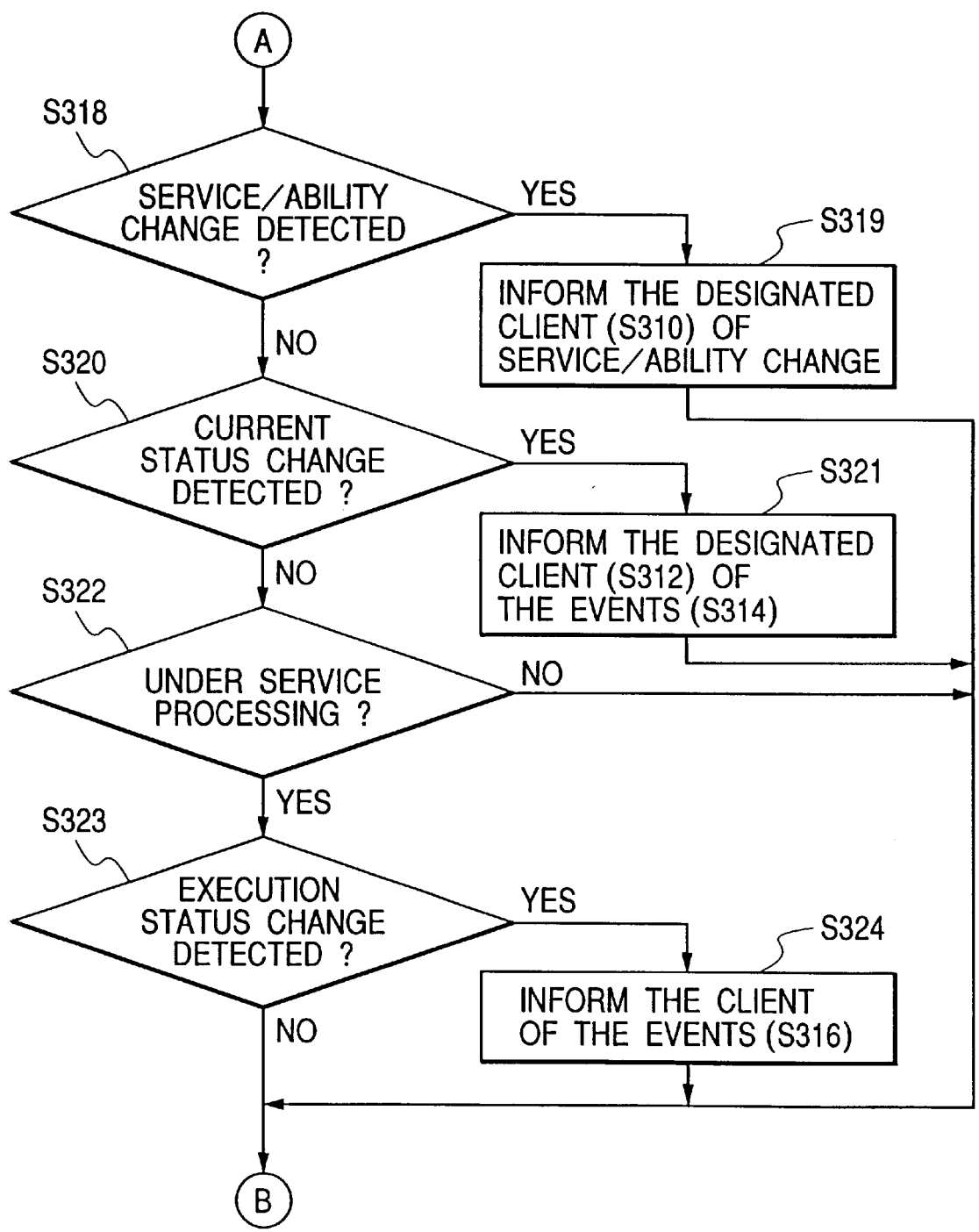

Control programs shown in flowcharts of FIGS. 8A, 8B and 8C or the like which can be executed by the CPU 12 are stored in the program ROM in the ROM 13. Further, font data (including outline font data) or the like which is used when the output information is produced is stored in the font ROM in the ROM 13. In case of a printer which does not have the external memory 14 such as a hard disk or the like, information or the like which is used on the client 101 is stored in the data ROM in the ROM 13.

The CPU 12 can communicate with the client 101 through an input section 18 and can notify the client 101 of the information or the like in the peripheral device 103.

Reference numeral 19 denotes an RAM which mainly functions as a main memory, a work area, or the like of the CPU 12 and whose memory capacity can be expanded by an option RAM that is connected to an expansion port (not shown).

The RAM 19 is used as an output information developing area, an environment data storing area, an NVRAM, or the like. An access to the external memory 14 such as hard disk (HD), IC card, or the like mentioned above is controlled by a disk controller (DKC) 20. The external memory 14 is connected as an option and stores: font data (including font data which is down-loaded from the client 101 or the like); an emulation program (including an emulation program which is down-loaded from the client 101 or the like); form data (which is down-loaded from the client 101 or the like), and the like.

Reference numeral 1012 denotes an operation panel mentioned above. Switches for operation, an LED display, and the like are arranged on the operation panel 1012.

The external memory is not limited to one memory but can be also constructed in a manner such that at least one or more external memories are provided and a plurality of option font cards as well as built-in fonts and a plurality of external memories in which programs to interpret printer control languages of different language systems have been stored can be connected. Further, it is also possible to have an NVRAM (not shown) and to individually store printer mode set information from the operation panel 1012 every user and every group.

A characteristic construction of the embodiment will now be described with reference to FIG. 2.

In the information processing apparatus (client 101) which can communicate with a plurality of or a single peripheral device 103 through a predetermined communication medium (interface 104, network 1000) constructed as mentioned above, when the CPU 1 inquires the service information or ability information that is peculiar to a plurality of or a single peripheral device and obtains the service information that is returned (the CPU 1 executes the control programs stored in the ROM 3 and external memory 102 and obtains the service information), the obtained service information or ability information of the plurality of or the single peripheral device is stored into the external memory 102 so that they can be identified. The CPU 1 receives the peculiar service information or ability information which is noticed from a plurality of or a single peripheral device by itself and updates the contents of the service information or ability information stored in the external memory 102. (The CPU 1 executes the control programs stored in the ROM 3 and external memory 102 and updates). When the CPU 1 inquires an operation status to a plurality of or a single peripheral device and obtains device status information that is returned (the CPU 1 executes the control programs stored in the ROM 3 and external memory 102 and obtains the device status information), whether a peculiar service request which is performed can be executed or not is discriminated by collating the service information stored in the external memory 102. (The CPU 1 executes the control programs stored in the ROM 3 and external memory 102 and discriminates). When the CPU 1 determines that the service request can be executed, the peculiar service request is performed to a plurality of or a single peripheral device which can execute the service request with reference to the ability information stored in the external memory 102. (The CPU 1 executes the control programs stored in the ROM 3 and external memory 102 and requests). Therefore, even if the ability information or service information of a plurality of or a single peripheral device fluctuates, while always managing the latest ability information or service information, a plurality of or a single optimum peripheral device to execute the peculiar service that is required can be automatically selected and the service can be requested.

Whether the service information or ability information which is stored into the external memory 102 has been initialized or not is discriminated (the CPU 1 executes the control programs stored in the ROM 3 and external memory 102 and executes an initialization discriminating process). When it is determined that the external memory 102 is not initialized yet, the CPU 1 inquires the service information or ability information that is peculiar to a plurality of or a single peripheral device and obtains the service information which is returned. Therefore, even if the ability information or service information of a plurality of or a single peripheral device fluctuates, the latest ability information or service information can be always managed.

Figure 3:
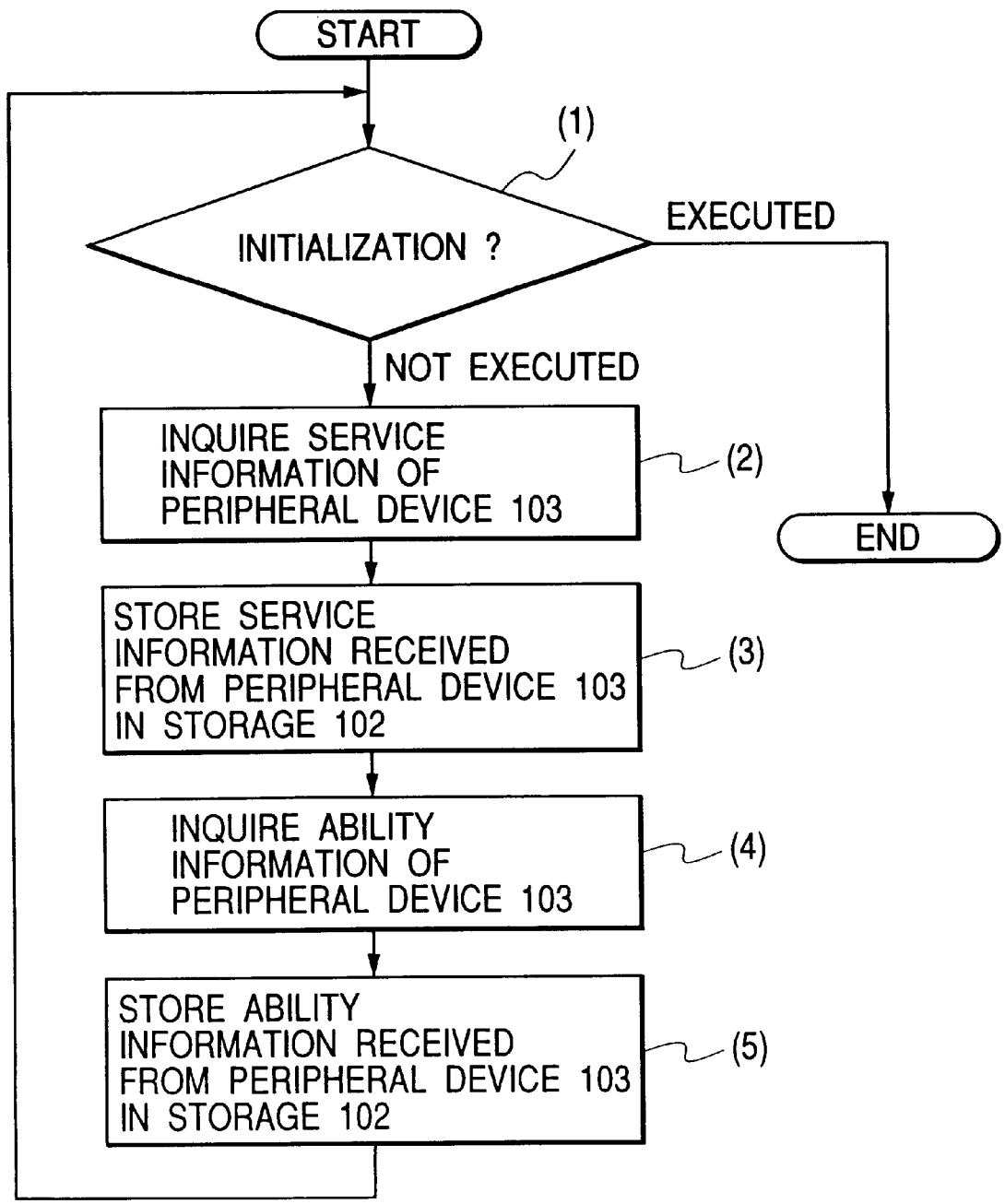
FIG. 3 is a flowchart showing an example of a first information processing procedure in the information processing apparatus according to the invention.

FIG. 3 is a flowchart showing an example of the first information processing procedure in the information processing apparatus according to the invention. FIG. 3 corresponds to processes for examining all of the services and abilities of all of the peripheral devices 103 connected to the client 101 and initializing (storing) them as service information and ability information into the storage 102 of the client 101. Reference numerals (1) to (5) denote processing steps.

The client 101 first confirms whether the service information or ability information in the storage 102 has been initialized or not (1). It can be confirmed by checking whether there is a file or information table in the storage 102. If the information in the storage 102 has already been initialized, the processing flow is finished.

In step (1), if it is decided that the information in the storage 102 is not initialized yet, an inquiry command is issued and the client 101 inquires the service information of the connected peripheral device 103 (2) and stores the service information obtained from the peripheral device 103 into the storage 102 (3). The client 101 also similarly inquires the ability information of the peripheral device 103 (4) and stores the obtained ability information into the storage 102 (5).

The above steps (1) to (5) are repeated until all of the service information and ability information about the connected peripheral devices 103. If the client 101 is connected to a plurality of peripheral devices 103, the initialization of those information is executed with regard to all of the connected peripheral devices and stored so that they can be identified.

Figure 4:
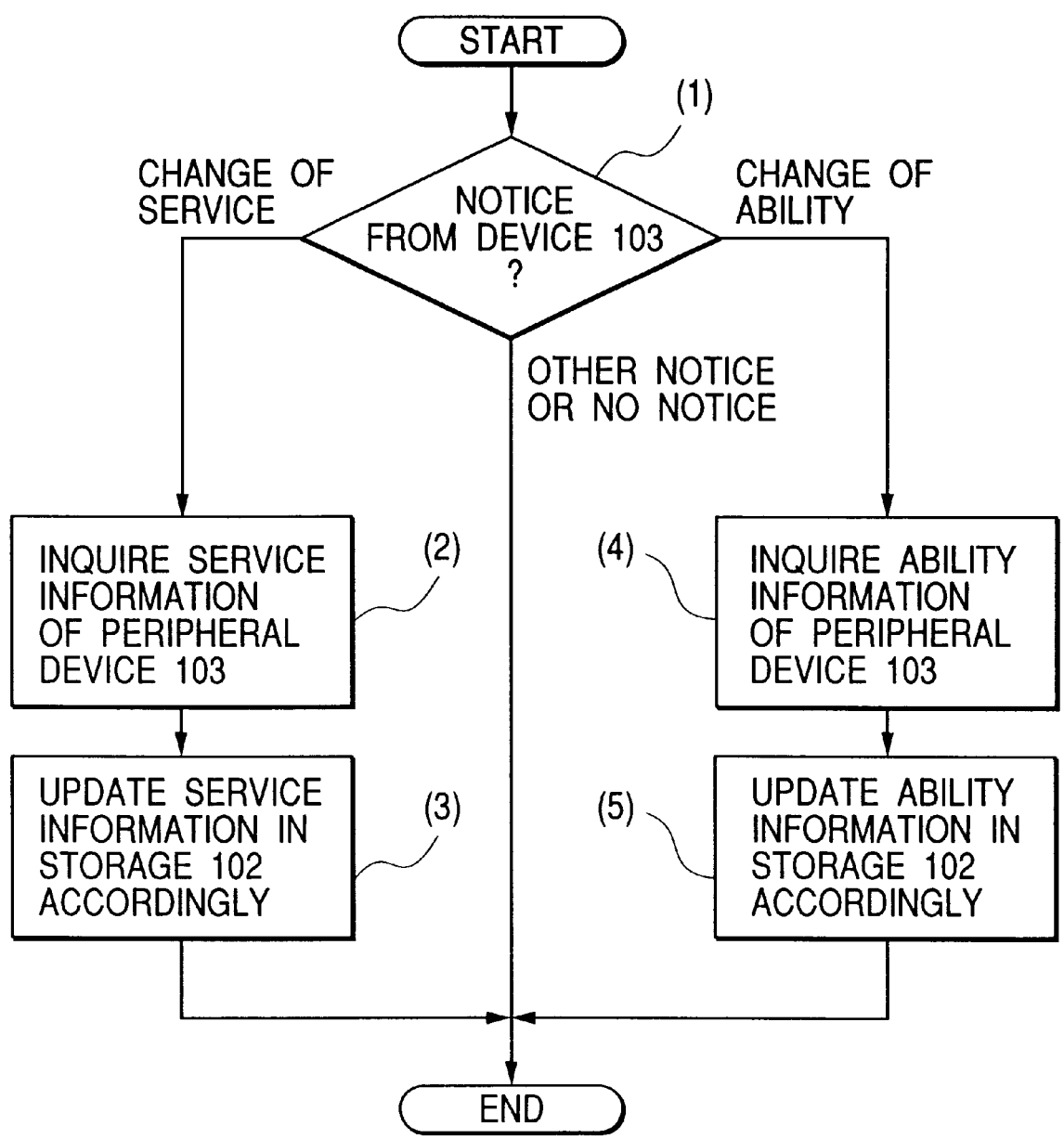
FIG. 4 is a flowchart showing an example of a second information processing procedure in the information processing apparatus according to the invention.

FIG. 4 is a flowchart showing an example of a second information processing procedure in the information processing apparatus according to the invention. FIG. 4 corresponds to a processing procedure when there is a notice from the peripheral device 103 to the client 101. Reference numerals (1) to (5) denote processing steps. As a message which is noticed from the peripheral device 103, there is a message to notify of a fact that the service or ability of the peripheral device 103 has been changed or a message to notify of a fact that the current status of the peripheral device 103 itself or the current status of the requested process has been changed. The process is performed with respect to the change in service or ability here.

First, the client 101 discriminates the presence or absence of the notice (1). If there is no notice, the processing flow is finished. If the received notice does not indicate the change in service or ability which the peripheral device 103 has, the processing flow is finished.

In step (1), if there is the notice and the CPU 1 determines that the notice shows the change of the service which the peripheral device has, the CPU 1 issues an inquiry command, thereby inquiring the service information of the peripheral device 103 (2). The information in the storage 102 is updated to the obtained service information (3).

If there is the notice in step (1) and the CPU 1 decides that the notice indicates the change of the ability which the peripheral device has, the CPU issues an inquiry command, thereby inquiring the ability information of the peripheral device 103 (4). The information in the storage 102 is updated to the obtained ability information (5). The processing routine is finished.

Figure 5:
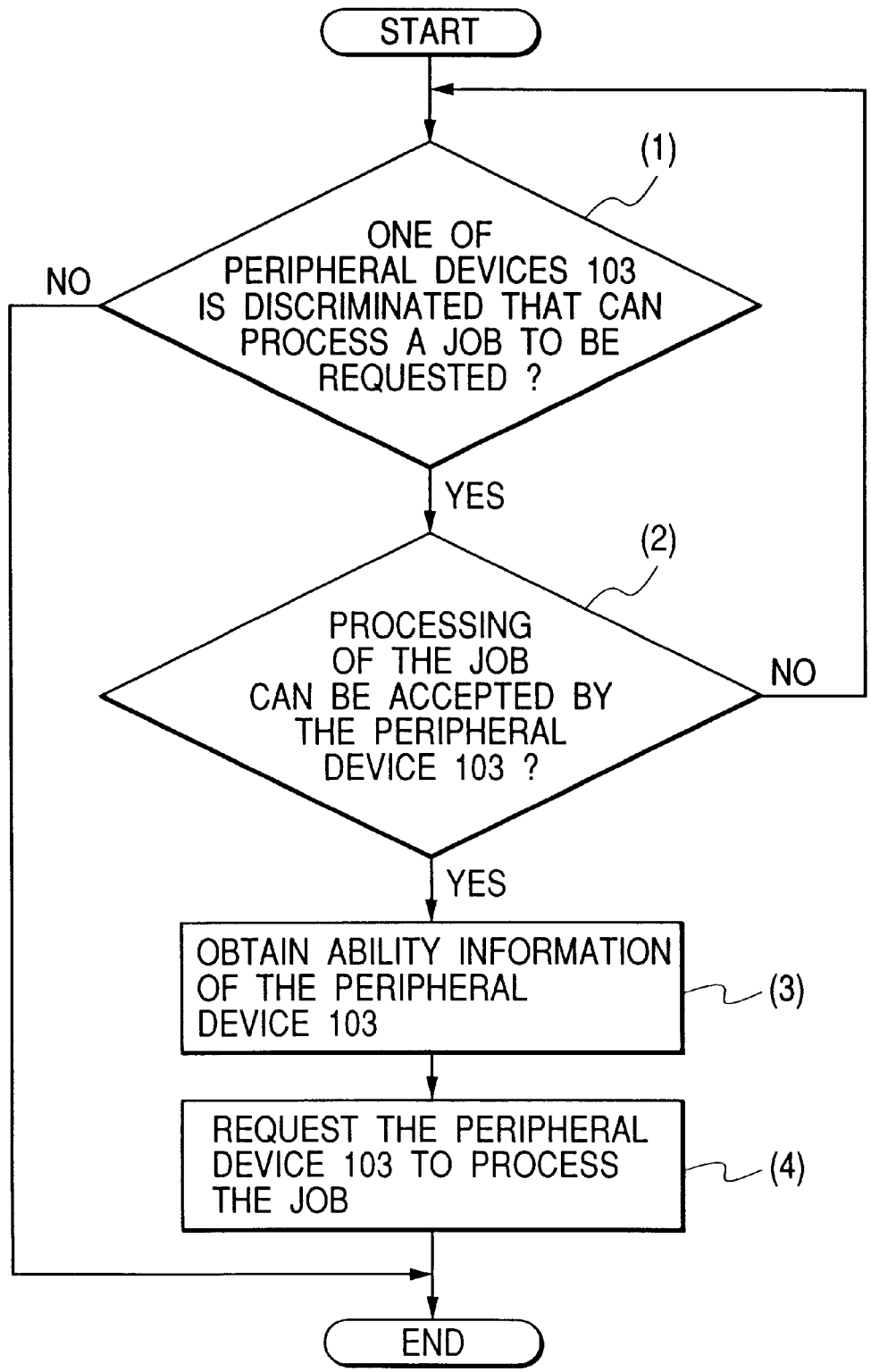
FIG. 5 is a flowchart showing an example of a third information processing procedure in the information processing apparatus according to the invention.

FIG. 5 is a flowchart showing an example of the third information processing procedure in the information processing apparatus according to the invention and corresponds to a processing procedure for designating a service of the peripheral device 103 and requesting a job process in the client 101. Reference numerals (1) to (4) denote processing steps. Ordinarily, the job process is requested by the user himself who operates the client 101, an application program which is operating in the client 101, or the like. At the time of the request of the job process, a designation of the job process to be executed is accompanied. For example, there is a print job, a scan job, a copy job, or the like.

First, the client 101 determines the peripheral device 103 which can execute the process to be requested (1). This decision is performed by searching the peripheral device which can perform the job process to be requested with reference to the service information and ability information stored in the storage 102 of the client 101. If such a peripheral device cannot be found, the processing flow is finished. In this case, a plurality of kinds of peripheral devices are connected to the network 1000.

The client 101 inquires in step (2) status of the peripheral device 103 decided in step (1). If the decided peripheral device 103 is in a status where the request of the job process cannot be accepted, the processing routine is returned to step (1) and another peripheral device 103 is determined. It is also possible to decide the number of retry times and to repeat step (2) until a state where the processing request can be accepted is obtained.

In step (2), if it is decided that the process can be performed, the detailed ability information of the decided peripheral device 103 is obtained with reference to the storage 102 of the client 101 (3). The job process of the service is requested to the peripheral device 103 (4) and the processing routine is finished. In step (4), the designation of various parameters or the like is executed by using the ability information obtained in step (3).

A characteristic construction of the embodiment will now be described hereinbelow with reference to the flowcharts shown in FIGS. 3 to 5 or the like.

In the information processing apparatus which can communicate a plurality of or a single peripheral device through a predetermined communication medium (interface 104, network 1000) constructed as mentioned above, the CPU 1 discriminates whether the service information or ability information which is registered into a memory resource (storage 102) has been initialized or not (step (1) in FIG. 4). The CPU receives the peculiar service information or ability information which is notified by itself from a plurality of or a single peripheral device and updates the contents of the service information or ability information registered in the memory resource (steps (2) and (3) or steps (4) and (5) in FIG. 4). The CPU inquires the operation status to a plurality of or a single peripheral device and obtains the device status information which is returned (step (2) in FIG. 5). The CPU 1 discriminates whether the peculiar service request which is performed can be executed or not by collating the service information registered in the memory resource (step (2) in FIG. 5). When the CPU 1 decides that the service request can be executed, the peculiar service request is performed to a plurality of or a single peripheral device which can execute the service request with reference to the ability information stored in the memory resource (steps (3) and (4) in FIG. 5). Therefore, even if the ability information or service information of a plurality of or a single peripheral device fluctuates, while always managing the latest ability information or service information, a plurality of or a single optimum peripheral device to execute the peculiar service that is required can be automatically selected and the service can be requested.

In the foregoing first embodiment, it is a prerequisite condition that the client 101 is always in the status where it can receive the notice from the peripheral device 103. However, actually, in the case where a power source of the client 101 is turned off or the like, there is a possibility such that a status where the notice from the peripheral device 103 cannot be received occurs. In such a status, if there is a change of the service or ability in the peripheral device 103, the service information and ability information stored in the storage 102 of the client 101 cannot reflect the latest status of the service and ability of the peripheral device 103. The second embodiment is made to avoid such a drawback.

A description of a construction of hardware is omitted because it is similar to that in FIGS. 1 and 2. In the initializing process shown in FIG. 3, namely, at the time of the initializing operation of the client 101 (after the power source was again turned on), the initialization of the information is certainly performed without confirming whether the information has been initialized or not. By this method, even in the case where the change notice of the information from the peripheral device 103 is not accepted because of a reason such that the power source on the client 101 side is not turned on or the like, the latest status of the peripheral device can be reflected. The processes in the other steps are similar to those described in the first embodiment. Processing routines of FIGS. 4 and 5 are similar to those described in the first embodiment.

Second Embodiment

In the foregoing first embodiment, unless the service information and ability information are perfectly initialized, the service process cannot be requested to the peripheral device 103. In the case where there are a large amount of service information and ability information or the case where many peripheral devices are connected to the client 101, there is a possibility such that it takes a fairly long time for initialization. The second embodiment is provided to avoid such a drawback.

A construction of the hardware shown in FIGS. 1 and 2 is similar to that described in the first embodiment.

A processing flow in the second embodiment of the invention will now be described with reference to FIGS. 6 and 7.

Figure 6:
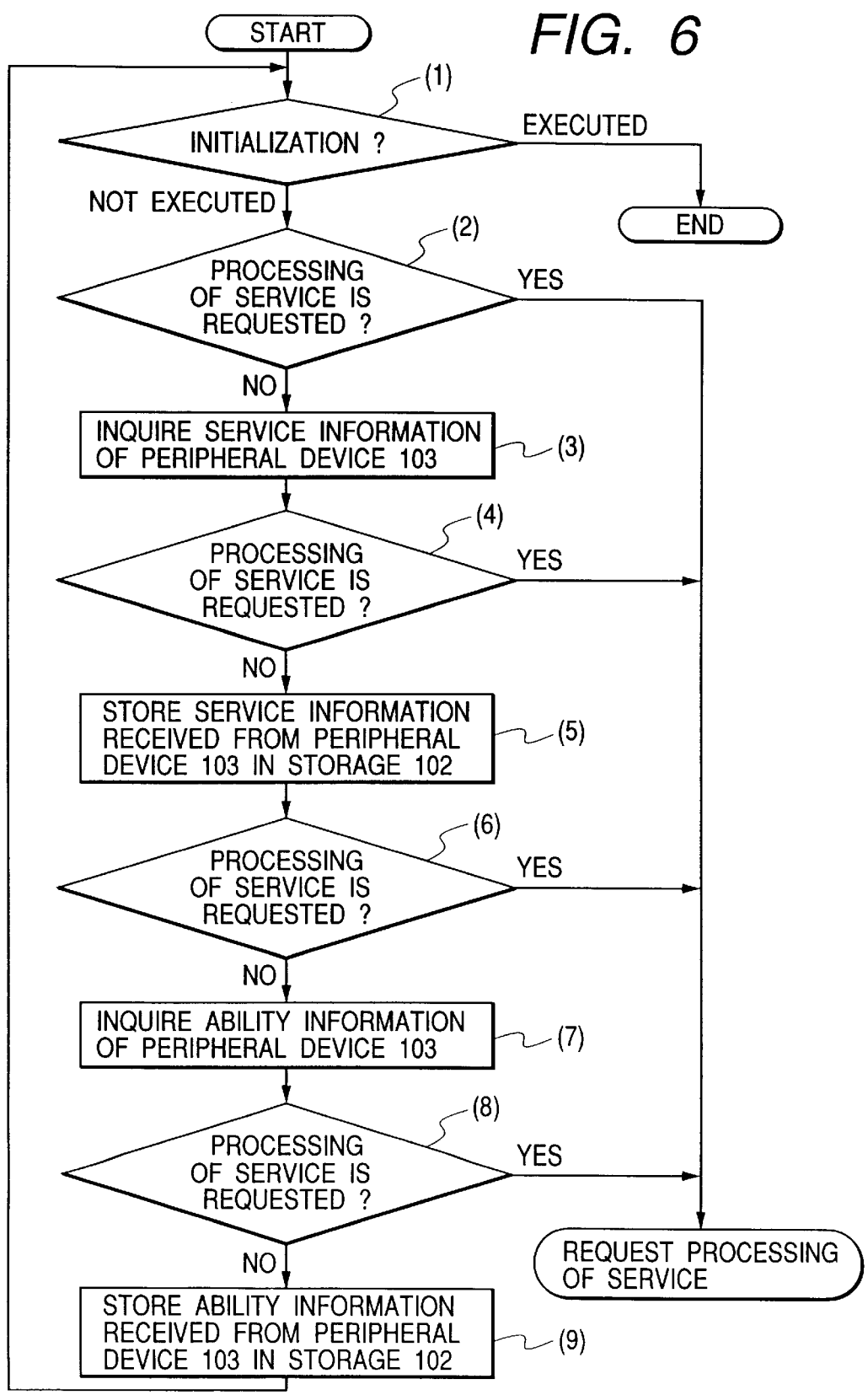
FIG. 6 is a flowchart showing an example of a fourth information processing procedure in the information processing apparatus according to the invention.

FIG. 6 is a flowchart showing an example of the fourth information processing procedure in the information processing apparatus according to the invention. FIG. 6 corresponds to a processing procedure for examining the services and abilities which all of the peripheral devices 103 connected to the client 101 have and for initializing them as service information and ability information into the storage 102 of the client 101. Reference numerals (1) to (9) denote processing steps.

First, the client 101 confirms whether the service information and ability information in the storage 102 have been initialized or not (1). It can be confirmed by checking whether there are files or information tables in the storage 102. If the information in the storage 102 has already been initialized, this processing flow is finished.

In step (1), when it is determined that the information in the storage 102 is not initialized, a check is made in step (2) to see if there is a request of the service process. If it is determined that there is the request of the service process, a processing flow for requesting the process, which will be explained in FIG. 7 hereinlater, is performed even during the execution of the initializing process.

If it is determined in step (2) that there is no request of the service process, the client 101 inquires the service information of the connected peripheral device 103 (3). For this period of time, the presence or absence of the request of the service process is discriminated in step (4). If it is decided that there is the request of the service process, a processing flow for requesting the process, which will be explained in FIG. 7 hereinlater, is performed even during the execution of the initializing process.

In step (4), if it is decided that there is no request of the service process, the service information obtained from the peripheral device 103 is stored into the storage 102 (5).

In step (6), subsequently, the presence or absence of a request of a process is discriminated. If it is decided that there is the request of the process, a processing flow for requesting the process, which will be explained in FIG. 7 hereinlater, is performed even during the execution of the initializing process.

In step (6), when it is decided that there is no request of the process, the CPU similarly inquires the ability information of the peripheral device 103 (7). For this period of time, the presence or absence of the request of the process is discriminated in step (8). If it is determined that there is the request of the service process, a processing flow for requesting the process, which will be explained in FIG. 7 hereinlater, is performed even during the execution of the initializing process.

On the other hand, when it is decided in step (8) that there is no request of the process, the obtained ability information is stored into the storage 102 (9). The processing routine is returned to step (1).

Figure 7:
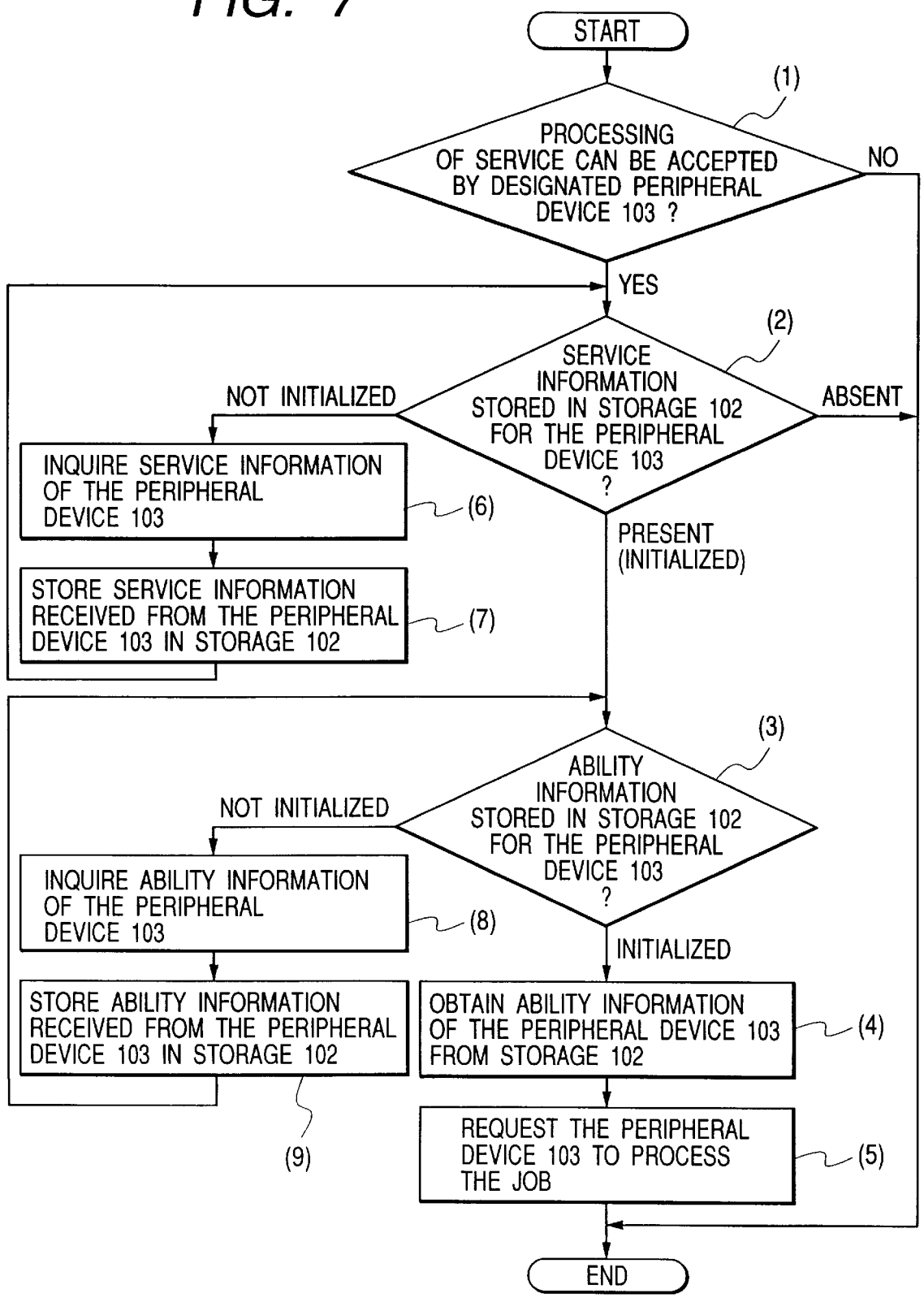
FIG. 7 is a flowchart showing an example of a fifth information processing procedure in the information processing apparatus according to the invention.

FIG. 7 is a flowchart showing an example of the fifth information processing procedure in the information processing apparatus according to the invention. FIG. 7 corresponds to a processing procedure for designating the service of the peripheral device 103 in the client 101 in steps (2), (4), (6), (8), and the like shown in FIG. 6 and for requesting the process. Reference numerals (1) to (9) denote processing steps. Usually, the request of the process is performed by the user himself who operates the client 101, an application program which is operating in the client 101, or the like. When the process is requested, it is accompanied with the designation of the process to be executed and the designation of the peripheral device 103 to perform the process.

First, the client 101 to request the process inquires the status of the designated peripheral device 103 by issuing a status inquiry command (1). If the designated peripheral device 103 is in the status such that it cannot accept the request of the process, this processing flow is finished. It is also obviously possible to predetermine the number of retry times and to repeat step (1) until a state where the processing request can be accepted is obtained.

In step (2), the service information of the designated peripheral device 103 is confirmed with reference to the storage 102 connected to the client 101. When it is decided that the service information is not initialized yet (non-initialization), step (6) follows. The CPU inquires the service information and stores the obtained service information into the storage 102 (7). The processing routine is again returned to step (2).

In step (2), if the designated peripheral device 103 cannot perform the designated process, the processing flow is finished.

In step (2), if it is determined that there is the service (initialized), the CPU 1 subsequently confirms the ability information of the designated peripheral device 103 with reference to the storage 102 connected to the client 101 (3). When it is determined that the ability information is not initialized yet (non-initialization), the CPU inquires the ability information (8) and stores the obtained ability information into the storage 102 (9). The processing routine is again returned to step (3).

In step (3), after confirming that the necessary ability information was initialized, the ability information of the designated peripheral device 103 is obtained with reference to the storage 102 connected to the client 101 (4).

Finally, the process of the service is requested to the peripheral device 103 (5). The processing routine is finished.

In step (5), the designation of parameters of various processes or the like is executed by using the ability information obtained in step (3).

Third Embodiment

The operation of the peripheral device 103 will now be described with reference to FIGS. 8A to 8C. FIGS. 8A to 8C are flowcharts showing the operation of the peripheral device 103 in FIG. 1.

Referring to FIG. 8A, first in step S301, a check is made to see if the data from the client 101 has been received through the input section 18. When the data from the client 101 is received, step S302 follows. The CPU 12 discriminates whether the data received from the client 101 is an ability or service inquiry command or not. When the data received from the client 101 is the inquiry command, step S303 follows. The ability or service regarding the process managed in the external memory 14 (hard disk) or RAM 19 is notified through the input section 18 to the client 101 which generated the inquiry. The process is finished. The contents of the ability inquiry are not limited so long as it is an inquiry of the ability regarding a process such as inquiry about the whole ability of the peripheral device 103, inquiry about a parameter in association with each ability, or the like. A reply corresponding to the contents of the inquiry is transmitted to the client 101. The service inquiry is an inquiry of the printing function, scanning function, copying function, FAX transmitting function, or FAX receiving function. The ability inquiry is requested from the client 101 after the service inquiry.

When the data received from the client 101 is not the ability or service inquiry command, step S304 follows. A check is made to see if the data received from the client 101 is a command to inquire the current status. When the CPU 12 decides that the data received from the client 101 is the current status inquiry command, step S305 follows. In step S305, through the input section 18, the CPU 12 notifies the client 101 which issued the inquiry of the change in current status which is managed in the external memory 14 or RAM 19. The process is finished. The contents of the current status inquiry are not limited so long as it is an inquiry regarding the current status which can be replied such as inquiry about the whole current status, inquiry regarding each status, or the like.

When the data received from the client 101 is not the current status inquiry command, step S306 follows. The CPU 12 discriminates whether the data received from the client 101 is an operation setting request command or not. When the data received from the client is the operation setting request command, step S307 follows. In step S307, the CPU 12 sets an operation parameter to execute the process which is requested from the client in accordance with the operation setting request from the client 101. The process is finished.

When the data received from the client 101 is not the operation setting request command, step S308 follows. A check is made to see if the data received from the client 101 is a service processing request command. When the CPU 12 decides that the data received from the client 101 is a service processing request command, step S309 follows. In step S309, the CPU 12 starts the execution of the process requested from the client 101, namely, various services. The process is finished. The service process is executed in parallel with a series of processes in the system and is executed in accordance with the operation parameter set in step S307. The client 101 which requested the process is managed by the CPU 12. The execution situation of the requested service process is monitored.

When the data received from the client 101 is not the service processing request, step S310 follows as shown in FIG. 8B. A check is made to see if the data received from the client 101 is a service ability change notice destination (addressee) setting request command. If the data received from the client 101 is a service ability change addressee setting request command, step S311 follows. In step S311, the CPU 12 sets the client designated by the service ability change addressee setting request from the client 101 as a client serving as an addressee of the service ability change when the service ability change is detected. The process is finished.

Besides the client 101, such a command can be also received from the other client on the network 1000 or the addressee can be also set to the other client.

When the data received from the client 101 is not the service ability change addressee setting request command, step S312 follows. A check is made to see if the data received from the client 101 is a current status change notice destination (addressee) setting request command. If the data received from the client 101 is the current status change addressee setting request command, step S313 follows. In step S313, the CPU 12 sets the client designated by the current status change addressee setting request command from the client 101 as a client serving as an addressee of the current status change when the current status change is detected. The process is finished.

Similarly, besides the client 101, such a command can be also received from the other client on the network 1000 or the addressee can be also set to the other client.

When the data received from the client 101 is not the current status change addressee setting request command, step S314 follows. A check is made to see if the data received from the client 101 is a current status change notice selecting request command. If the data received from the client 101 is the current status change notice selecting request command, step S315 follows. In step S315, on the basis of the current status change notice selecting request command, in the case where the change in current status is detected, the CPU 12 sets an event serving as a target to be notified to the client in the changed status. The process is finished.

Similarly, besides the client 101, such a command can be also received from the other client on the network 1000.

When the data received from the client 101 is not the current status change notice selecting request command, step S316 follows. A check is made to see if the data received from the client 101 is an execution status notice selecting request command. If the data received from the client 101 is an execution status notice selecting request command, step S317 follows. In step S317, on the basis of the execution status notice selecting request command, in the case where the change in execution status is detected, the CPU 12 sets an event serving as a target to be notified to the client in the changed execution status. The process is finished.

Similarly, besides the client 101, such a command can be also received from the other client on the network 1000.

When it is determined in step S301 of FIG. 8A that the data from the client 101 is not received through the input section 18, step S318 follows as shown in FIG. 8C. The CPU 12 discriminates whether the service ability change has been detected or not. When the service ability change regarding the process is detected, step S319 follows. In step S319, through the input section 18, the CPU 12 notifies the client designated in step S310 in the client 101 of the change contents of the service ability regarding the process. The process is finished.

When the CPU 12 does not detect the service ability change regarding the process, step S320 follows. The CPU 12 discriminates whether the change in current status has been detected or not. When the current status change is detected, step S321 follows. In step S321, the event set in step S314 in the changed status is notified through the input section 18 to the client designated in step S312 in the client 101. The process is finished. When the event set in step S314 is not included in the changed status, the event is not notified to the designated client.

When the CPU 12 does not detect the current status change, step S322 follows. A check is made to see if the service process is being executed. If the process is not being executed, step S323 follows and the CPU 12 discriminates whether the change in execution status has been detected. When the execution status change is detected, step S324 follows. In step S324, through the input section 18, the CPU 12 notifies the client which requested the process (service) of the event set in step S316 in the changed execution status. The process is finished. When the event set in step S316 is not included in the changed execution status, the event is not notified to the client which requested the process.

By constructing the peripheral device control system as mentioned above, the information to enable the function to be sufficiently utilized in response to the request from the client side can be notified to the client side. The operation parameters necessary to execute the process can be set from the client side. The use efficiency is improved and it is possible to perform the management for enabling the function to be sufficiently utilized from the client side.

A construction of an information processing program which can be read out by the information processing apparatus according to the invention will now be described hereinbelow with reference to a memory map shown in FIG. 9.

FIG. 9 is a diagram for explaining the memory map of a storing medium to store various information processing programs which can be read out by the information processing apparatus according to the invention.

Although not particularly shown in the diagram, there is also a case where information to manage a group of programs which are stored into the storing medium, for example, version information, a person who made, and the like are also stored, and information depending on the OS or the like on the program reading side, for instance, an icon and the like to identify and display the program are also stored.

Further, the data depending on the various programs is also managed in the directory. There is also a case where a program to install the various programs into a computer or, in the case where the installing program has been compressed, a program for decompressing, and the like are also stored.

Figure 10:
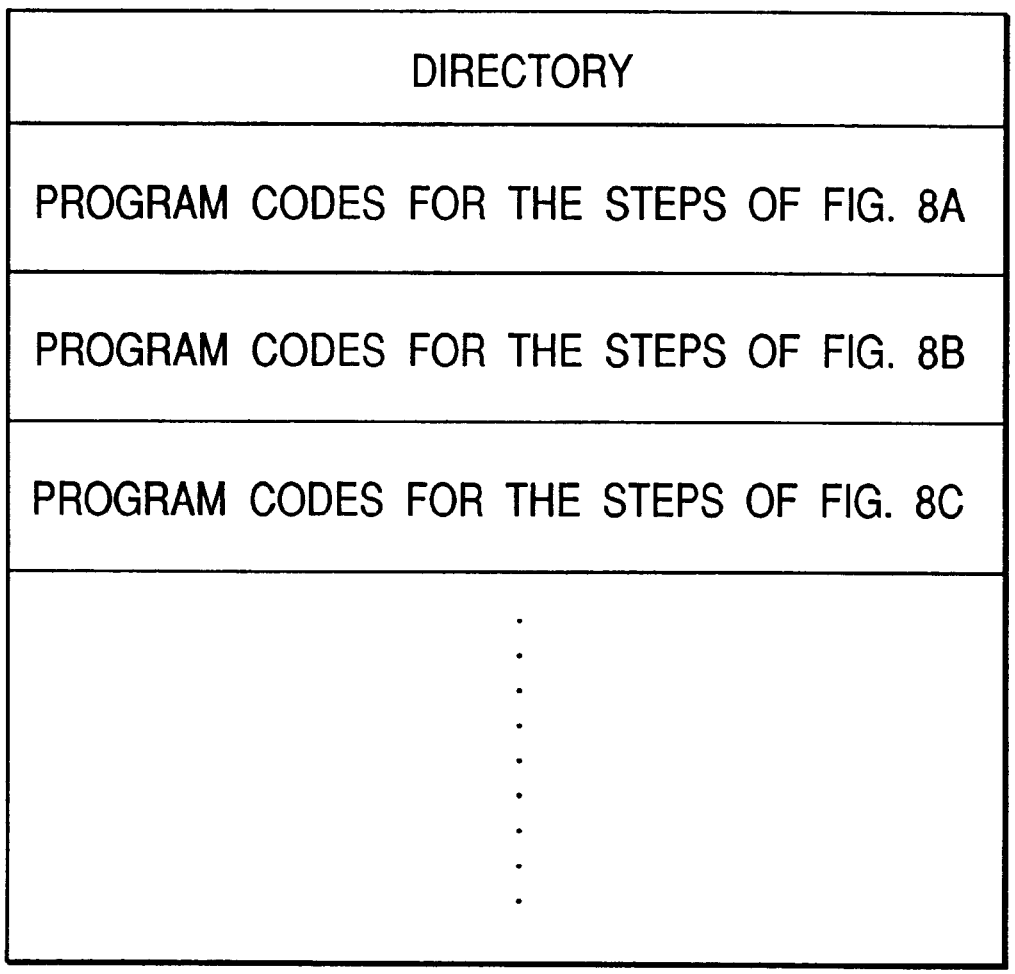
FIG. 10 is a diagram for explaining a memory map of a storing medium to store various programs which can be read out by the peripheral device according to the invention.

The functions shown in FIGS. 3 to 7 in the embodiment are executed by a host computer on the basis of a program which is installed from the outside. In this case, the invention is applied even in the case where a group of information including the program is supplied to the apparatus by a storing medium such as CD-ROM, flash memory, FD, or the like other than the external memory 102 or from an external storing medium through the network. Similarly, the control program shown in the flowcharts of FIGS. 8A to 8C also constructs a memory map shown in FIG. 10. The CPU 12 executes the various programs and data stored in the external memory 14.

It will be obviously understood that the object of the invention is accomplished by a method whereby the storing medium on which program codes of software to realize the functions of the foregoing embodiments have been recorded is supplied to a system or an apparatus and a computer (or a CPU or an MPU) of the system or apparatus reads out the program codes stored in the storing medium and executes them.

In this case, the program codes themselves read out from the storing medium realize the novel functions of the invention and the storing medium on which the program codes have been stored constructs the invention.

As a storing medium for supplying the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

It will be obviously understood that the invention also incorporates not only a case where the functions of the embodiments are realized by executing the read-out program codes by the computer but also a case where on the basis of an instruction of the program codes, the OS (Operating System) or the like which is operating on the computer executes a part or all of the actual processes and the functions of the foregoing embodiments are realized by the processes.

Further, it will be obviously understood that the invention also incorporates a case where the program codes read out from the storing medium are written into a memory provided for a function expanding board inserted in a computer or a function expansion unit connected to the computer and, after that, on the basis of an instruction of the program codes, a CPU or the like provided for the function expanding board or function expansion unit executes a part or all of the actual processes, and the functions of the foregoing embodiments are realized by the processes.

What is claimed is:

1. An information processing apparatus for connection to a peripheral device, comprising:

discrimination means for discriminating whether a change notice received from an external source indicates a change in service of the peripheral device or a change in ability of the peripheral device; and obtaining means for obtaining service information showing a service of the peripheral device or ability information showing an ability of the peripheral device in response to a discrimination result by said discrimination means.

2. An apparatus according to claim 1, wherein the peripheral device has a printer engine and a scanner engine.

3. An apparatus according to claim 1, wherein the service of the peripheral device is a printing function.

4. An apparatus according to claim 1, wherein the service of the peripheral device is a scanning function.

5. An apparatus according to claim 1, wherein the service of the peripheral device is a copying function.

6. An apparatus according to claim 1, wherein the service of the peripheral device is a FAX transmitting function.

7. An apparatus according to claim 1, wherein the service of the peripheral device is a FAX receiving function.

8. An apparatus according to claim 1, wherein the ability of the peripheral device is a set value which can be set into the peripheral device when operating the peripheral device.

9. An information processing apparatus for connection to a peripheral device comprising:

a controller for discriminating whether a change notice received from an external source indicates a change in service of the peripheral device or a change in ability of the peripheral device, and for obtaining service information showing a service of the peripheral device or ability information showing an ability of the peripheral device in response to a discrimination result.

10. An information processing method for connection to a peripheral device, comprising the steps of:

discriminating whether a change notice received from an external source indicates a change in service of the peripheral device or a change in ability of the peripheral device; and obtaining service information showing a service of the peripheral device or ability information showing an ability of the peripheral device in response to a discrimination result of the discriminating step.

11. A storing medium to store a control program which can be executed by an information processing apparatus and is used for connection to a peripheral device, wherein said program comprises the steps of:

discriminating whether a change notice received from an external source indicates a change in service of the peripheral device or a change in ability of the peripheral device; and obtaining service information showing a service of the peripheral device or ability information showing an ability of the peripheral device in response to a discrimination result of the discriminating step.

12. An information processing system for obtaining information of a peripheral device, comprising:

notification means for providing a notice indicating that a service or an ability of the peripheral device has changed;

discrimination means for discriminating whether the notice provided by said notification means indicates a change in service of the peripheral device or a change in ability of the peripheral device; and obtaining means for obtaining service information showing a service of the peripheral device or ability information showing an ability of the peripheral device in response to a discrimination result by said discrimination means.

13. A peripheral device connected to an information processing apparatus, comprising:

detection means for detecting a change in service or a change in ability of said peripheral device; and control means for sending a change notice to the information processing apparatus in response to the change detected by said detection means.

14. A device according to claim 13, further comprising a printer engine and a scanner engine.

15. A device according to claim 13, wherein the service of the peripheral device is a printing function.

16. A device according to claim 13, wherein the service of the peripheral device is a scanning function.

17. A device according to claim 13, wherein the service of the peripheral device is a copying function.

18. A device according to claim 13, wherein the service of the peripheral device is a FAX transmitting function.

19. A device according to claim 13, wherein the service of the peripheral device is a FAX receiving function.

20. A device according to claim 13, wherein the ability corresponds to a set value which can be set into said peripheral device when using said peripheral device, and the service corresponds to a function which can be provided by said peripheral device.

21. A control method of controlling a peripheral device connected to an information processing apparatus, comprising the steps of:

detecting a change in service or a change in ability of the peripheral device; and sending a change notice indicating the change in service or the change in ability to said information processing apparatus in response to a detection in said detecting step.

22. A storing medium to store a control program of controlling a peripheral device connected to an information processing apparatus, wherein said control program comprises the steps of:

detecting a change in service or a change in ability of the peripheral device; and sending a change notice indicating the change in service or the change in ability to said information processing apparatus in response to a detection in said detecting step.

23. A peripheral device connected to an information processing apparatus, comprising:

a controller for detecting a change in service or a change in ability of the peripheral device and sending a change notice indicating the change in service or the change in ability to said information processing apparatus in response to the detected change.

24. An apparatus according to claim 1, wherein the service corresponds to a function which can be provided by the peripheral device.

25. An apparatus according to claim 1, wherein said obtaining means issues a command to inquire of the service information or the ability information to the peripheral device.

26. An apparatus according to claim 1, wherein the change notice is a message to notify said apparatus of the change in service or ability of the peripheral device.

27. An apparatus according to claim 1, further comprising storing means for storing the service information or ability information obtained by said obtaining means.

28. An apparatus according to claim 1, wherein the peripheral device has a plurality of kinds of services.

29. A storage medium according to claim 11, wherein the service is at least one of a printing function, a scanning function, a copying function, a FAX transmitting function, and a FAX receiving function.

30. A storage medium according to claim 11, wherein the ability corresponds to a set value which can be set into the peripheral device when using the peripheral device, and the service corresponds to a function which can be provided by the peripheral device.

31. A storage medium according to claim 11, wherein said obtaining step issues a command to inquire of the service information or the ability information to the peripheral device.

32. A storage medium according to claim 11, wherein the change notice is a message to notify the information processing apparatus of the change in service or ability of the peripheral device.

33. A storage medium according to claim 11, wherein the control program further comprises the step of storing the service information or the ability information obtained in said obtaining step.

34. A storage medium according to claim 11, wherein the peripheral device has a plurality of kinds of services.

35. A control program provided in a storage medium executed by an information processing apparatus for connection to a peripheral device, comprising the steps of:
discriminating whether a change notice received from an external source indicates a change in service of the peripheral device or a change in ability of the peripheral device; and
obtaining service information showing a service of the peripheral device or ability information showing an ability of the peripheral device in response to a discrimination made in said discriminating step.

36. A control program according to claim 35, wherein the service is at least one of a printing function, a scanning function, a copying function, a FAX transmitting function, and a FAX receiving function.

37. A control program according to claim 35, wherein the ability corresponds to a set value which can be set into the peripheral device when using the peripheral device, and the service corresponds to a function which can be provided by the peripheral device.

38. A control program according to claim 35, wherein said obtaining step issues a command to inquire of the service information or the ability information to the peripheral device.

39. A control program according to claim 35, wherein the change notice is a message to notify the information processing apparatus of the change in service or of the change in ability of the peripheral device.

40. A control program according to claim 35, wherein the control program further comprises the step of storing the service information or the ability information obtained in said obtaining step.

41. A control program according to claim 35, wherein the peripheral device has a plurality of kinds of services.

* * * * *